(12) United States Patent
Li et al.

(10) Patent No.: US 8,180,887 B2
(45) Date of Patent: May 15, 2012

(54) GEOLOCATION MAPPING OF NETWORK DEVICES

(75) Inventors: Dan Li, Beijing (CN); Yunxin Liu, Beijing (CN); Chuanxiong Guo, Nanjing (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 12/336,163

(22) Filed: Dec. 16, 2008

(65) Prior Publication Data

US 2010/0153540 A1 Jun. 17, 2010

(51) Int. Cl.
*G06F 15/16* (2006.01)
*G06F 15/173* (2006.01)

(52) U.S. Cl. .................. 709/224; 709/203; 709/217
(58) Field of Classification Search .................. 709/203, 709/238, 217, 223–224
See application file for complete search history.

(56) References Cited

U.S. PATENT DOCUMENTS

| | | | |
|---|---|---|---|
| 6,681,099 B1 * | 1/2004 | Keranen et al. ............ 455/67.16 |
| 6,762,997 B1 | 7/2004 | Liu et al. |
| 6,885,641 B1 | 4/2005 | Chan et al. |
| 6,937,569 B1 * | 8/2005 | Sarkar et al. .................. 370/238 |
| 7,065,584 B1 | 6/2006 | Shavitt et al. |
| 7,111,073 B1 | 9/2006 | Jain et al. |
| 7,296,088 B1 | 11/2007 | Padmanabhan et al. |
| 7,363,367 B2 | 4/2008 | Lloyd et al. |
| 7,644,167 B2 * | 1/2010 | Lee et al. ...................... 709/229 |
| 7,649,838 B2 * | 1/2010 | Fishteyn et al. ............... 370/229 |
| 7,827,279 B2 * | 11/2010 | Xu et al. ........................ 709/225 |
| 7,983,691 B1 * | 7/2011 | Wong et al. ................ 455/456.1 |
| 8,086,249 B1 * | 12/2011 | Dinan et al. ............... 455/456.1 |
| 2003/0195960 A1 * | 10/2003 | Merriam ....................... 709/224 |
| 2004/0157621 A1 | 8/2004 | Yamasaki et al. |
| 2004/0199623 A1 * | 10/2004 | Houri ............................ 709/223 |
| 2005/0071417 A1 * | 3/2005 | Taylor et al. .................. 709/200 |
| 2005/0120105 A1 | 6/2005 | Popescu et al. |
| 2005/0171695 A1 | 8/2005 | Sullivan et al. |
| 2005/0198328 A1 * | 9/2005 | Lee et al. ...................... 709/229 |
| 2006/0087986 A1 | 4/2006 | Dube et al. |
| 2006/0209717 A1 * | 9/2006 | Sharma et al. ................ 370/254 |
| 2007/0097951 A1 | 5/2007 | Hilt et al. |
| 2007/0182631 A1 * | 8/2007 | Berlinsky et al. ........ 342/357.15 |
| 2008/0010367 A1 * | 1/2008 | Chen et al. .................... 709/223 |
| 2008/0032706 A1 | 2/2008 | Sheynblat et al. |
| 2008/0207226 A1 | 8/2008 | Shen et al. |

OTHER PUBLICATIONS

Chen, et al., "On the Stability of Network Distance Estimation", ACM SIGMETRICS Performance Evaluation Review vol. 30, Issue 2, Sep. 2002, pp. 21-30, 10 pages.

(Continued)

*Primary Examiner* — Joshua Joo
(74) *Attorney, Agent, or Firm* — Lee & Hayes, PLLC

(57) ABSTRACT

A geographic location of a network device is determined using response delay times from internet servers used as landmarks. A coordination server provides to a client a list of area landmark servers (ALS) with known geographic locations. The client probes ALSs, measures response delays, and provides results to the coordination server. The coordination server then provides to the client a list of additional city landmark servers (CLS) within the area. The client probes the CLSs and provides results to the coordination server which then determines the geographic location of the client.

18 Claims, 11 Drawing Sheets

OTHER PUBLICATIONS

Katz-Basset, et al., "Towards IP Geolocation Using Delay and Topology Measurements", Internet Measurement Conference, Proceedings of the 6th ACM SIGCOMM conference on Internet Measurement, 2006, pp. 71-84, 13 pages.

Leonard, et al., "Turbo King: Framework for Large-Scale Internet Delay Measurements", INFOCOM 2008, The 27th Conference of Computer Communications, Volume, Issue, Apr. 13-18, 2008, pp. 31-35, 9 pages.

Szymaniak, et al., "Practical Large-Scale Latency Estimation", Computer Networks: The International Journal of Computer and Telecommunications Networking, vol. 52, Issue 7, May 2008, pp. 1343-1364, 23 pages.

PCT Search Report for PCT Application No. PCT/US2009/065295, mailed Nov. 20, 2009 (13 pages).

* cited by examiner

GEOLOCATION MAPPING OF NETWORK DEVICES

BACKGROUND

Internet service operators such as e-commerce, media outlets, information providers, etc., benefit from knowing the geographic location of their users. Geographic location ("geolocation") information may be used to provide location specific content, to perform network load balancing, or to provide demographic information.

Location specific content may include providing local weather information, localizing content by providing language- and/or country-specific interfaces, providing selective access based on location, etc. Geolocation may assist in network load balancing by routing data traffic to servers geographically closer to the users. Demographic information of user locations may be used for marketing and planning purposes.

Existing geolocation services suffer from errors, maintenance, performance, and reliability problems, particularly in regions with rapidly growing networks. In regions with rapidly growing networks, given the distributed and highly variable nature of the internet, delay-based geolocation methods using triangulation are inaccurate. Delay-based systems rely on an assumption that a linear correlation exists between networking delay and the distance between a client and a landmark. These delays are then used to triangulate the approximate position of the client. A client may be any user, server, or other network device which is connected to a network. A landmark is any network device with a known geolocation which is used as a reference point.

In richly-connected internet regions (RCIRs), for example North America and Western Europe, the assumption of a high correlation between delay and distance may provide useful data for triangulation methods. However, in moderately-connected internet regions (MCIRs), for example developing nations, this assumption breaks down and the correlation is no longer valid. Factors contributing to this include network congestion, circuitous paths, moderate inter-autonomous system (AS) connections, etc. Thus, in MCIRs, the delay between a client and a landmark does not sufficiently correlate with the physical distance between the client and landmark to enable usably accurate triangulation based geolocation.

SUMMARY

As described above, regions with rapidly growing networks are particularly susceptible suffer from errors, maintenance, performance, and reliability problems.

This disclosure describes providing geolocation information of a client in a MCIR or a RCIR using a closest-shortest ("CS") rule. The CS rule uses the observation that the shortest delay comes from the closest physical distance.

In one aspect, a coordination server maintains a list of landmark servers. The landmark servers have known geographic locations and are known to have responded to probes in the past. Landmarks need not be actively maintained or administered by the coordination server, or even necessarily by the same entity owning the coordination server, and thus may be considered passive.

A network client ("client") may execute an application, script, or other process which establishes communication with the coordination server. The coordination server determines a general region in which the client is located by analyzing a network address of the client, and provides a list of area landmarks in that region to the client. The client then probes the area landmark servers and sends delay results back to the coordination server. The coordination server then uses the CS rule to determine the area of the region in which the client is located, and provides a list of city servers within the determined area. The coordination server provides the city servers to the client, which then probes the city servers. Increasing the number of landmarks probed may increase accuracy. Probe results are transmitted to the coordination server, which then uses the delay information as interpreted by the CS rule to determine the geolocation of the client. Use of the CS rule in probing provides better accuracy in MCIRs over delay based triangulation because networking delays are not translated into erroneous physical distance measurements.

BRIEF DESCRIPTION OF THE DRAWINGS

The disclosure is made with reference to the accompanying figures. In the figures, the left most reference number digit identifies the figure in which the reference number first appears. The use of the same reference numbers in different figures indicates similar or identical terms.

DETAILED DESCRIPTION

Figure 1:
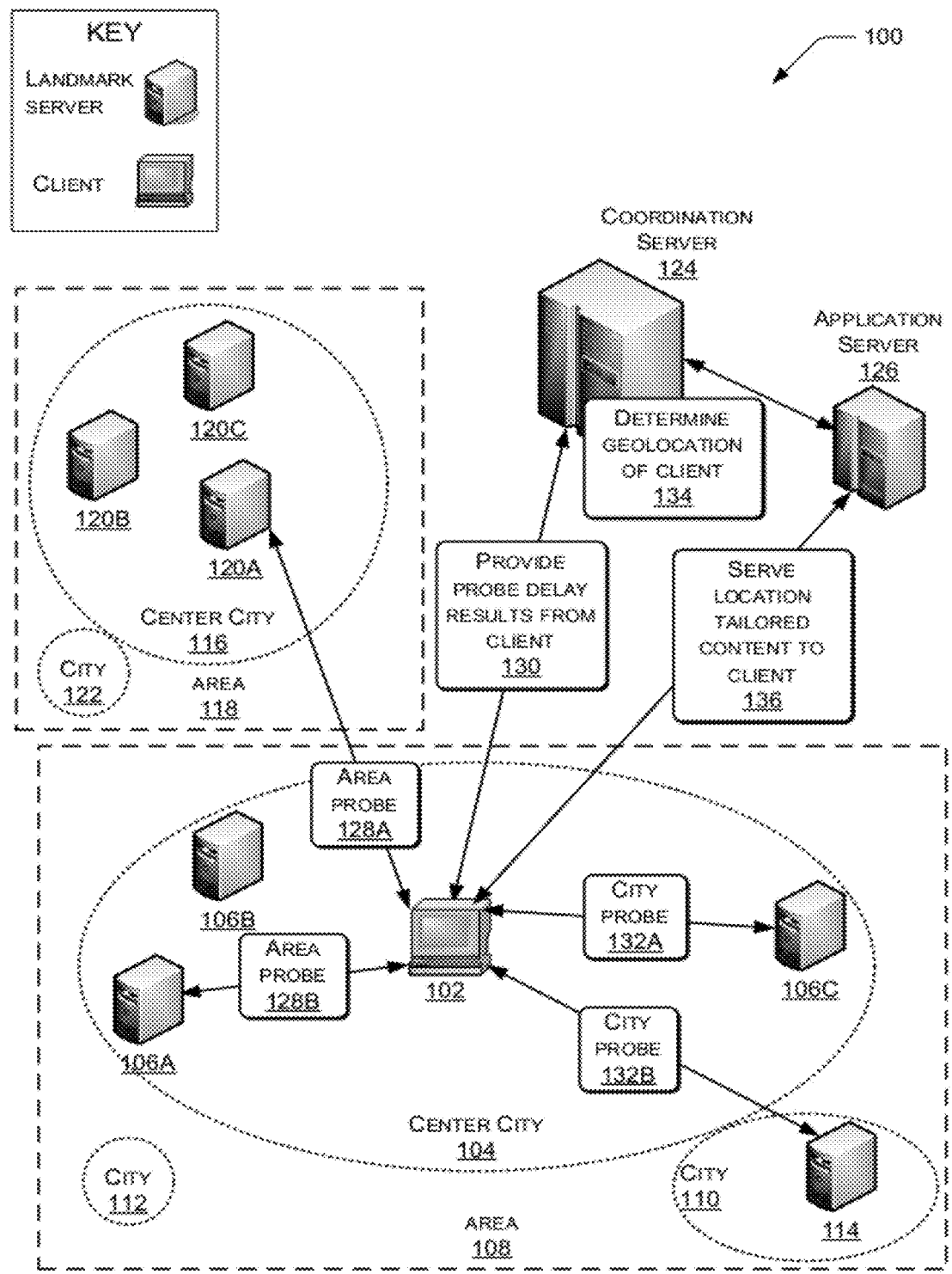
FIG. 1 is a diagram of an illustrative network having landmark servers and a coordination server gathering probe data from a client to determine geolocation.

FIG. 1 is a diagram of an illustrative network encompassing a region 100. Regions are larger geographic areas, for example, continents, countries, global hemispheres, etc. A client 102 is located within a center city 104. A "center city" is considered to be the center or an area. A center city may be a geographic center, center from a networking delay standpoint, or combination of the two. Within the geographic boundaries of center city 104 are landmark servers 106A, 106B, and 106C. Center city 104 is located within geographic area 108. Also within area 108 are cities 110 and 112. Within city 110 is landmark server 114.

Also shown is center city 116 located within area 118. Within center city 116 are landmarks servers 120A, 120B, and 120C. City 122 is also located within area 118. In the illustrated example, both areas 108 and 118 are located within the region 100.

Coordination server 124 and application server 126 are shown outside of areas 108 and 118. However, coordination server 124 and application server 126 may be located in the same or different locations, and may be within an area or city.

To determine a geolocation of the client, the coordination server first determines a region based on the network address from the client 102. The coordination server 124 provides to the client 102 a list of landmark servers in one or more areas in the region. In the illustrated example, the client 102 probes 128A area landmark server 120A in area 118 and then probes 128B area landmark server 106A located in area 108. Probe delay results are provided 130 to the coordination server 124 which determines the area using the CS rule. That is, the area level landmark server having the shortest communication delay is determined to be closest to the client 102. The absolute value of the delay is not itself considered significant, but rather the relative ranking of the delay results. The coordination server 124 may then provide a list of city-level landmark servers within the determined area to client 102 for probing. The client 102 may then probe 132A city landmark server 106C and then probe 132B landmark server 114 located in city 110. Probe delay results are provided 130 to the coordination server 124, which then determines 134 geolocation of the client again using the CS rule. At this stage, the city level landmark server having the shortest communication delay is determined to be closest to the client 102. In fact, in some implementations, the client 102 may be determined to be located in the city in which the city level landmark server having the shortest delay is located.

The coordination server 124 may then provide geolocation information to the application server 126 which may then serve content 136 tailored to the location of the client 102.

Figure 2:
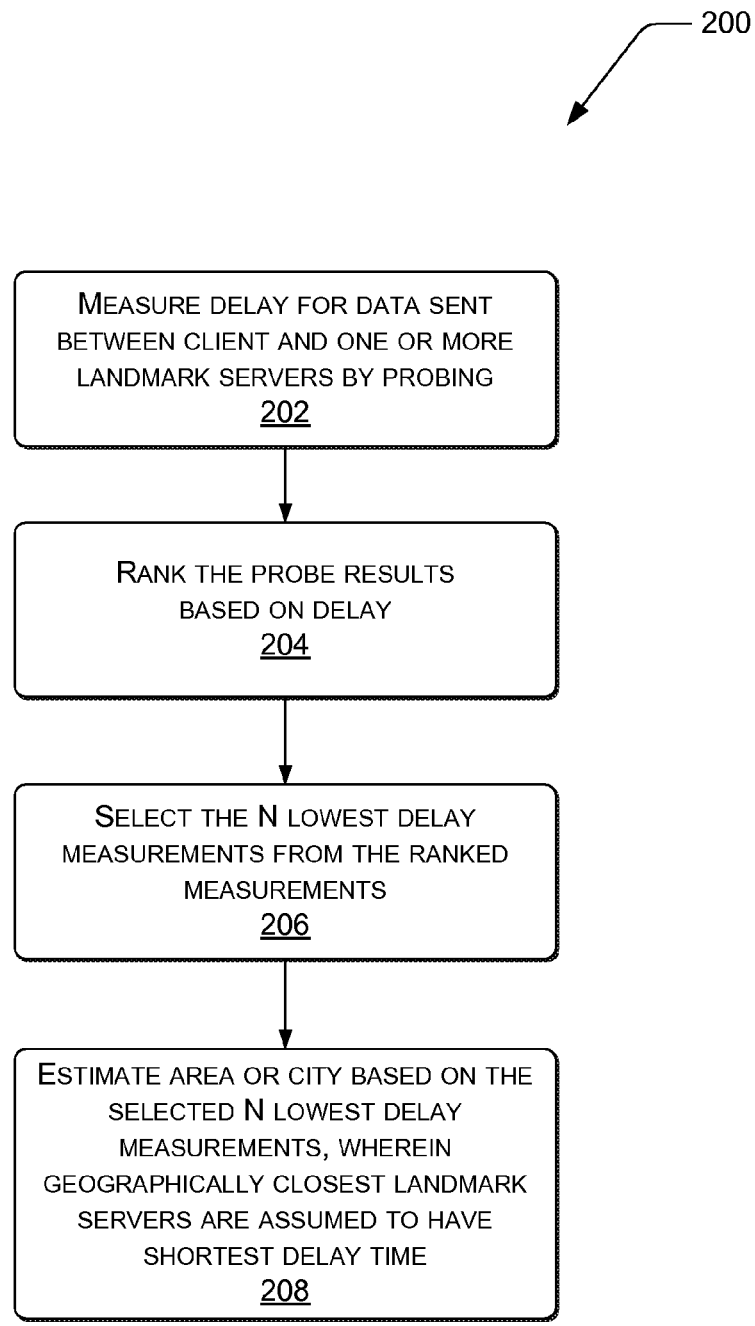
FIG. 2 is a flow diagram of an illustrative process using the closest-shortest rule to determine geolocation.

FIG. 2 is a flow diagram of an illustrative process using the closest-shortest rule to determine geolocation. At 202, a client measures a time delay for data sent between the client and one or more landmark servers by probing the landmark servers to produce probe results. The probing may comprise an Internet Control Message Protocol (ICMP) packet, a Hypertext Transfer Protocol/Get (HTTP/Get request), or other interrogation which elicits a response from a landmark server. HTTP/Get provides the advantage of being relatively easy to implement in scripting languages such as JavaScript™ and ECMAScript, and may provide a better response than ICMP. The time delay may either be round-trip, or one way. Generally, increasing the number of landmark servers probed results in increased accuracy of the resulting geolocation.

At 204, probe results are ranked based on the magnitude of the delay producing ranked measurements. For example, the results may be ranked with the probe result having a lowest delay magnitude having a rank of 0.

At 206, the N lowest ranked measurements are selected. N may be any predetermined threshold value. For example, if one hundred probes are made, N may be five. Thus, the five probe results having the lowest delays will be selected.

At 208, the N lowest delay measurements are compared against the geolocation of the landmark servers producing those lowest delay measurements. The closest-shortest rule assumes that the geographically closest landmark servers will have the shortest delay time to respond to a client. Thus the location of the client is estimated, for example, as being in the same city as the probe result measurement with the lowest delay time.

Figure 3:
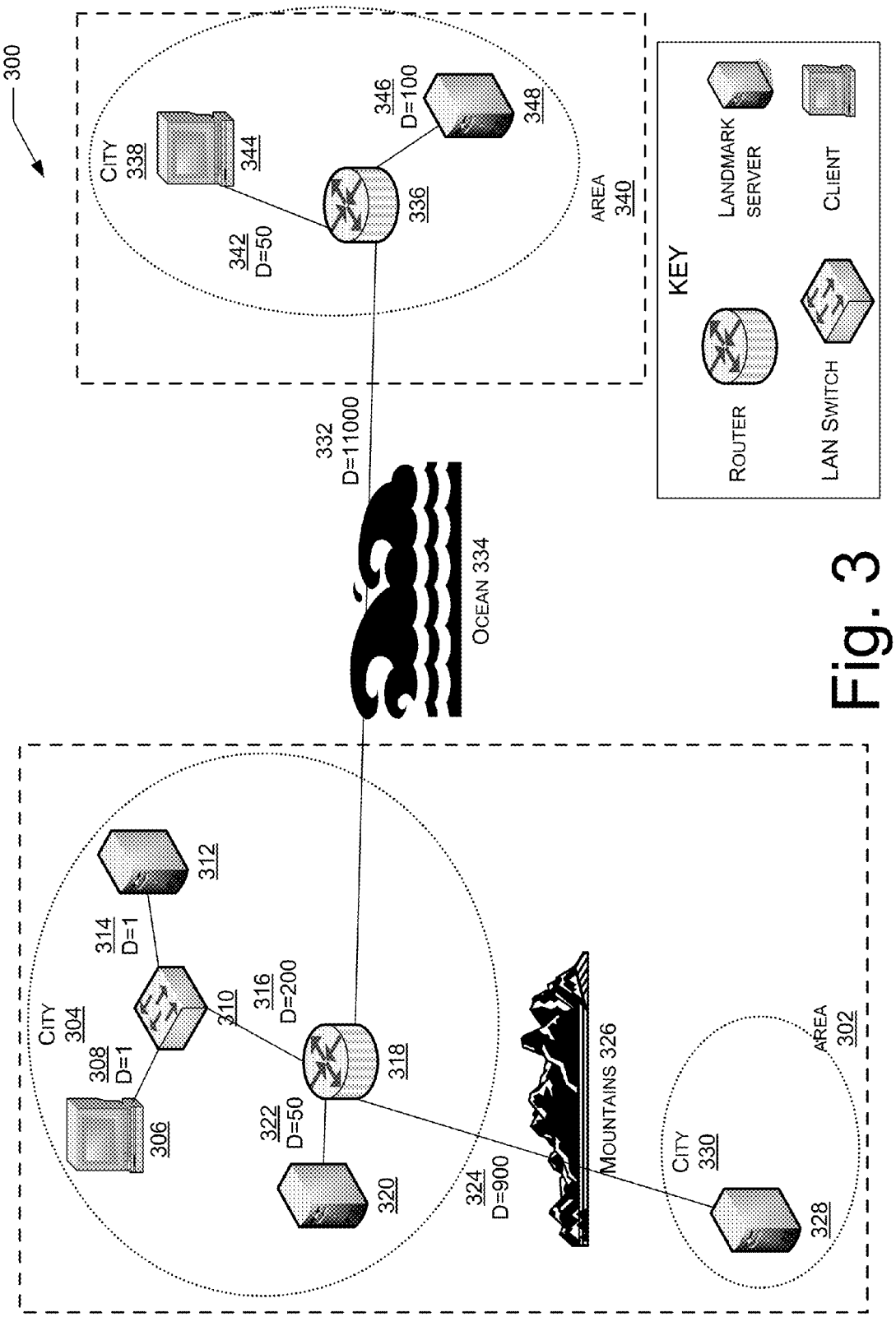
FIG. 3 is a diagram of an illustrative network showing servers and relative distances to illustrate the closest-shortest rule.

FIG. 3 is a schematic diagram of an illustrative network 300 showing servers and relative distances to illustrate the closest-shortest rule. Inside an area 302 resides a city 304. Areas and cities may be any convenient bounded geographic area, for example a political subdivision such as a state or province, statistical survey areas, etc. Areas and cities are within regions.

Within city 304 is a client 306. Client 306 connects via link 308 having a delay "D" of 1 to local area network (LAN) switch 310. For the purposes of this illustration "D" indicates a time delay, for example, measured in milliseconds (ms). Server 312 is also within city 304 and connects via link 314 which also has a delay of 1 to LAN switch 310. These delays are typically short because client 306 and server 312 are on the same physical subnetwork and communicate directly with the LAN switch 310.

LAN switch 310 connects via link 316 having a delay of 200 to router 318 which is also within city 304. Server 320, also within city 304 connects via link 322 having a delay of 50 to router 318.

Router 318 in city 304 connects via link 324 having a delay of 900 and travels across mountains 326 to server 328 located within city 330, which is also within area 302.

Router 318 in city 304 also connects via link 332 which has a delay of 11,000 and travels across ocean 334 to router 336. Router 336 is located within city 338 which is inside area 340. Within city 338, router 336 connects via link 342 having a delay of 50 to client 344. Also within city 338, router 336 connects via link 346 having a delay of 100 to server 348.

A summation of delays between various nodes in the network illustrates the shortest-closest rule. Table 1 shows the summation of one-way delays between client 306 and various points in the network.

TABLE 1

| START | AREA | CITY | DESTINATION | AREA | CITY | SUM OF DELAY (ONE-WAY) |
|---|---|---|---|---|---|---|
| 306 | 302 | 304 | 312 | 302 | 304 | 2 |
| 306 | 302 | 304 | 318 | 302 | 304 | 201 |
| 306 | 302 | 304 | 320 | 302 | 304 | 251 |
| 306 | 302 | 304 | 328 | 302 | 330 | 1101 |
| 306 | 302 | 304 | 344 | 340 | 338 | 11251 |
| 306 | 302 | 304 | 348 | 340 | 338 | 11301 |

The closest-shortest rule can be used to determine the likely area and city within which client 306 resides using known geolocations of servers, such as landmark servers. For example, client 306 probes all servers shown to determine delays. The results are shown in Table 2.

TABLE 2

| START | DESTINATION | AREA | CITY | SUM OF DELAY (ONE-WAY) | RANK |
|---|---|---|---|---|---|
| 306 | 312 | 302 | 304 | 2 | 0 |
| 306 | 320 | 302 | 304 | 251 | 1 |
| 306 | 328 | 302 | 330 | 1101 | 2 |
| 306 | 348 | 340 | 338 | 11301 | 3 |

When the N lowest ranked measurements are selected, where N=2, ranked items 0 and 1 are selected. These two entries are in area 302, and thus using the closest shortest rule, it is assumed that client 306 is geographically within area 302. Unlike delay based triangulation which are prone to errors in MICRs, use of the CS rule provides greater accuracy. The process may be repeated using a set of servers within a known area to further identify the city of the client using servers in cities within the area.

Figure 4:
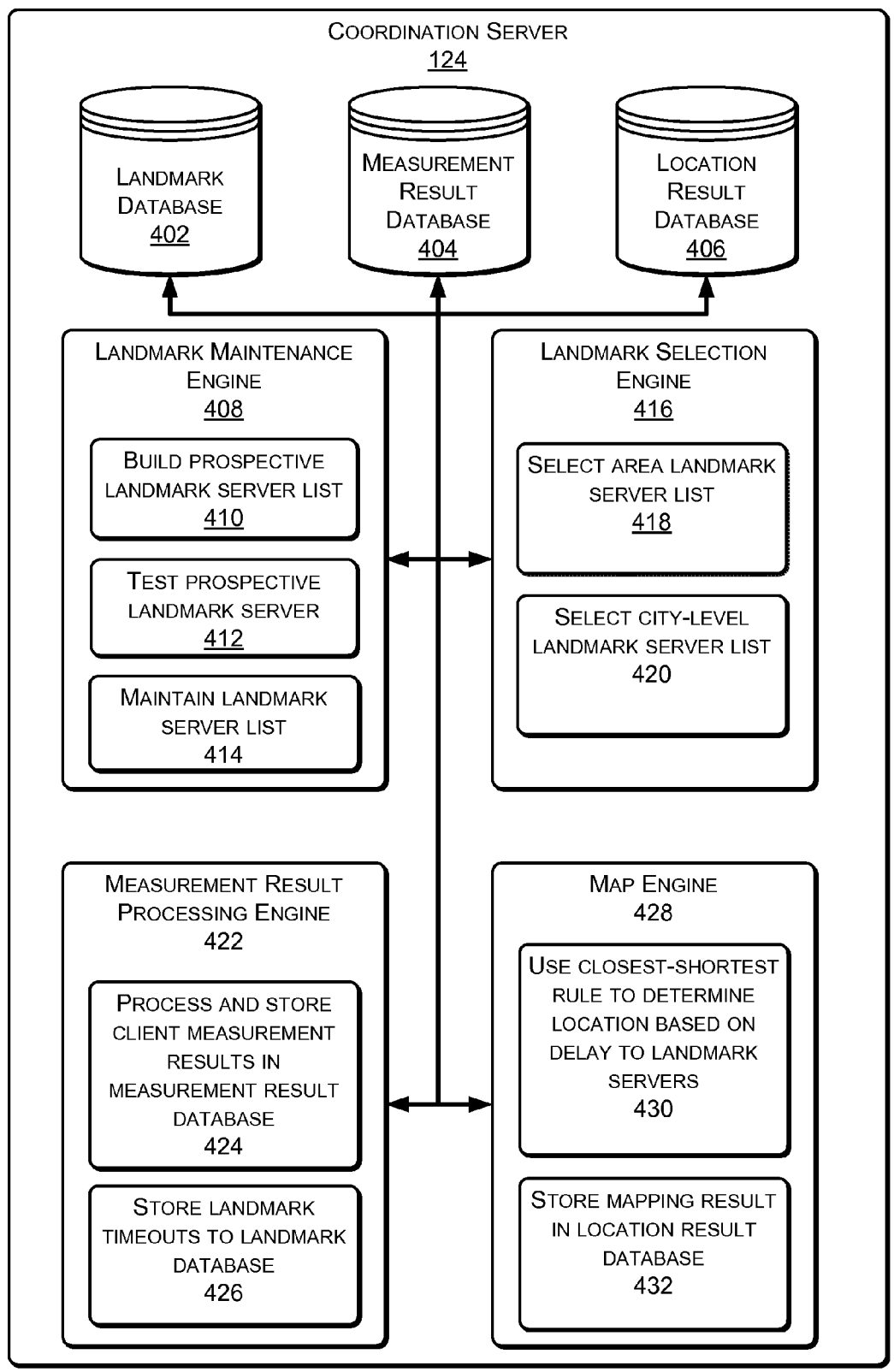
FIG. 4 is a diagram of an illustrative coordination server.

FIG. 4 is an illustrative diagram of a coordination server 124. Coordination server 124 may be a single server, distributed environment such as a cluster, virtual server, etc. Coordination server 124 may comprise one or multiple databases and engines. As described in this application, modules and engines may be implemented using software, hardware, firmware, or a combination of these. In the illustrated example, the modules and engines are implemented using software including instructions stored on a computer readable storage medium or otherwise in memory and executable on a processor.

In the illustrated example, a landmark database 402 stores the information of landmark servers used, including their network addresses, geolocations, as well as status information such as timeout errors reported by clients. Network addresses may include internet protocol ("IP") address, for example.

A measurement result database 404 stores both area-level and city-level measurement results, including the network addresses of the client and the corresponding landmark servers probed, as well as the measured delays.

A location result database 406 stores geographical mapping results of clients, including the network addresses of clients and corresponding cities in which the network addresses are determined to be located.

A landmark maintenance engine 408 may comprise several functions. Because the conditions of the landmark servers continuously change, the landmark maintenance engine 408 dynamically maintains the list of landmark servers in the landmark database 402. These functions are discussed in more depth below, but include building prospective landmark server lists 410, testing prospective landmark server lists 412, and maintaining landmark server lists 414.

A landmark selection engine 416 may comprise several functions. These include selecting area landmark servers 418 and selecting city-level landmark servers 420 for clients upon request. These functions are discussed in more depth below.

A measurement result processing engine 422 may comprise several functions. These include processing and storing client measurement results 424 in the measurement result database 404 and storing landmark timeouts 426 to the landmark database 402.

A map engine 428 may comprise several functions. These include using the closest-shortest rule to determine the geolocation of a client 430 and storing mapping results 432 in a location results database 406.

Figure 5:
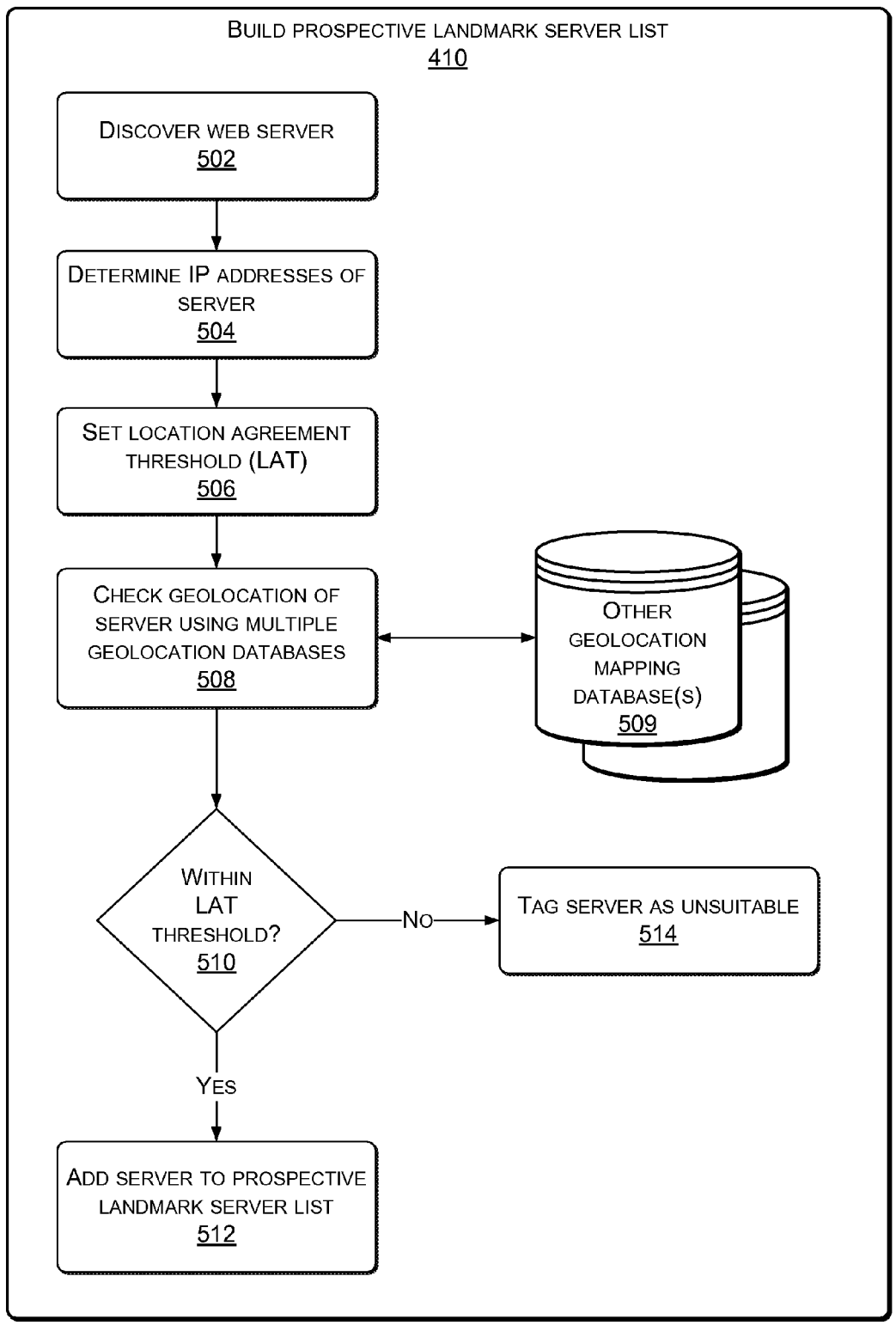
FIG. 5 is a flow diagram of an illustrative process of building a prospective landmark server list.

FIG. 5 is a flow diagram showing details of an illustrative process of building the prospective landmark server list 410. At 502, a web server is discovered. While web servers are mentioned herein, other types of servers may be used, for example mail servers. This discovery may occur as a result of web crawling, port scans, etc. At 504, an IP address of the server is determined.

At 506, a location agreement threshold (LAT) is set. This threshold is used to determine how many other geolocation databases must agree for a geolocation of a server to be considered valid. For example, when the LAT is set to $\geq 3$, then three or more geolocation databases must report a server as being at substantially the same location before the geolocation is accepted as being valid for use in the landmark server list.

At 508, a geolocation of the server discovered in 502 is made using conventional geolocation mapping databases or services 509.

At 510, the landmark maintenance engine 408 determines whether the LAT has been reached. When the LAT is reached and multiple servers report substantially the same location for the server discovered in 502, the server is added 512 to the prospective landmark server list. If the LAT is not met, at 514, the server is tagged as unsuitable. Unsuitable servers may be tested again at a later date, where desired.

Figure 6:
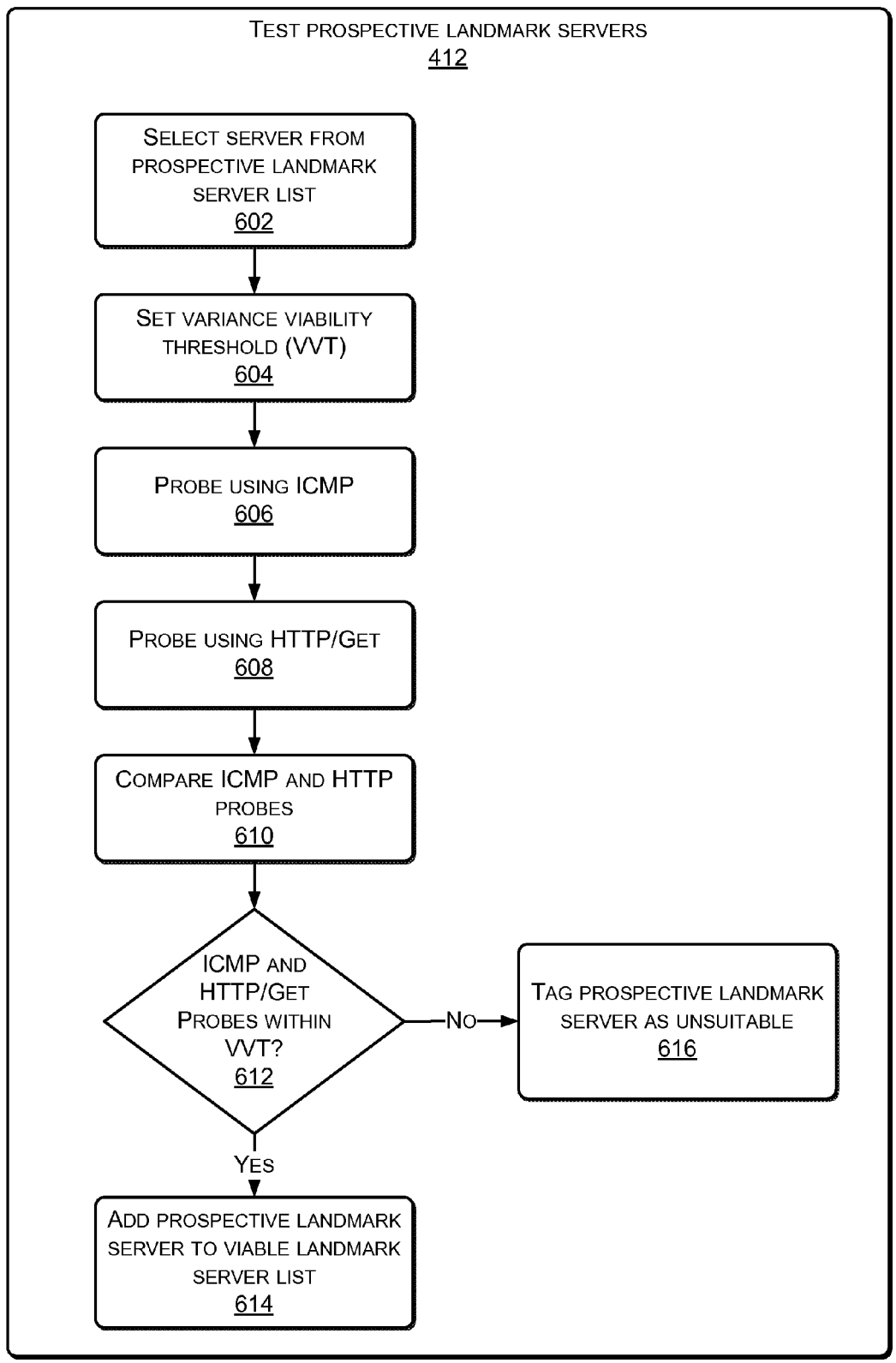
FIG. 6 is a flow diagram of an illustrative process of testing the prospective landmark servers.

FIG. 6 is a flow diagram of an illustrative process of testing prospective landmark servers 412. At 602, a server is selected from a prospective landmark server list. At 604, a variance viability threshold (VVT) is set. This threshold determines the acceptable level of variance between results of different probing techniques. For example, where ICMP and HTTP/Get probes are used, this variance may specify that the ICMP and HTTP/Get measurements must be within a specific percentage or absolute value of one another. While ICMP and HTTP/Get probes are described, other interrogation methods may additionally or alternatively be used.

At 606, the server is probed using an ICMP packet. At 608, the server is probed using HTTP/Get. At 610, the ICMP and HTTP/Get probes are compared. At 612, a determined is made as to whether the ICMP and HTTP/Get probes are within the VVT. When the probes are within the VVT, the prospective landmark server is added to the landmark server list at 614. When the probes are not within the VVT, the server is tagged as unsuitable at 616. Unsuitable servers may be tested again at a later date, where desired.

Figure 7:
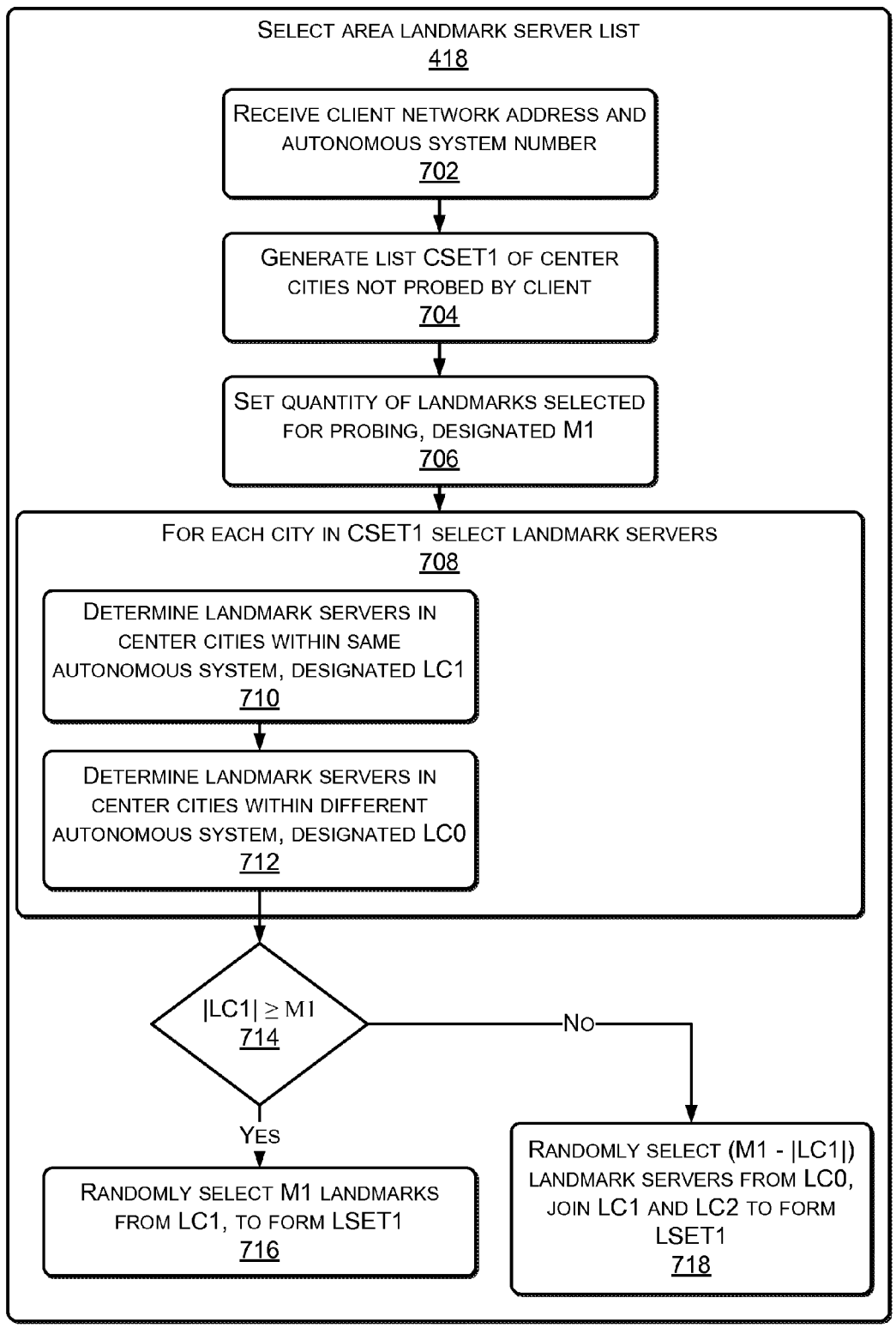
FIG. 7 is a flow diagram of an illustrative process of selecting area landmark servers for a client.

FIG. 7 is a flow diagram of an illustrative process of selecting area landmark servers for a client 418 at a coordination server 124. At 702, the coordination server 124 receives a network address and autonomous system number from a client. At 704, a list of center cities not probed by the client designated CSET 1 is generated. At 706, a quantity of landmarks selected for probing is set and designed M1. At 708, for each city in CSET1, one or more landmark servers are selected.

The selection of landmark servers at 708 comprises two steps. At 710, landmark servers in center cities within the same autonomous system are determined and designated group LC1. At 712, landmark servers in center cities within different autonomous systems are determined and designated group LC0.

At 714, a determination is made and where $|LC1| \geq M1$, then at 716 M1 landmarks are randomly selected from LC1 to form a first set of landmark servers LSET1. When $|LC1| < M1$, at 718, (M1−|LC1|) landmark servers are randomly selected from LC0, and LC1 and LC2 are joined to form LSET1.

Figure 8:
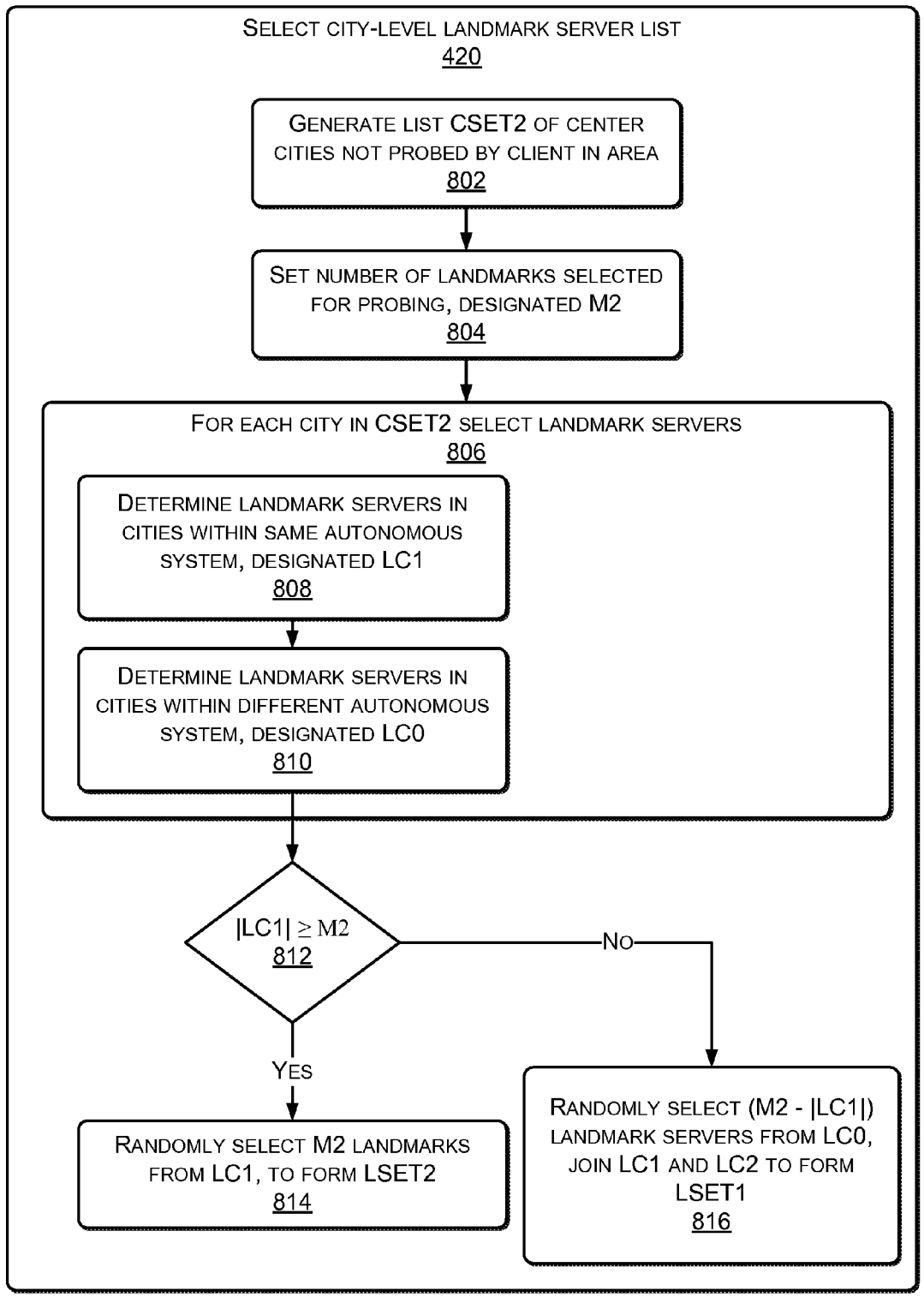
FIG. 8 is a flow diagram of an illustrative process of selecting city-level landmark servers for a client.

FIG. 8 is a flow diagram illustrating selecting city-level landmark servers 420 for a client. At 802, a list CSET2 of center cities not probed by the client in the area is generated. At 804, the number of landmarks selected for probing is set and designated M2. At 806, for each city in CSET2, landmark servers are selected.

The selection of landmark servers in 806 comprises two steps. At 808, landmark servers in cities within the same autonomous system are determined and designated LC1. At 810, landmark servers in cities with different autonomous systems are determined and designated LC0.

At 812, a determination is made and where $|LC1| \geq M2$, at 814 M2 landmarks are randomly selected from LC1 to form a second set of landmark servers LSET2. When $|LC1| < M2$, at 816, (M2−|LC1|) landmark servers are randomly selected from LC0, and LC1 and LC2 are joined to form LSET2.

Figure 9:
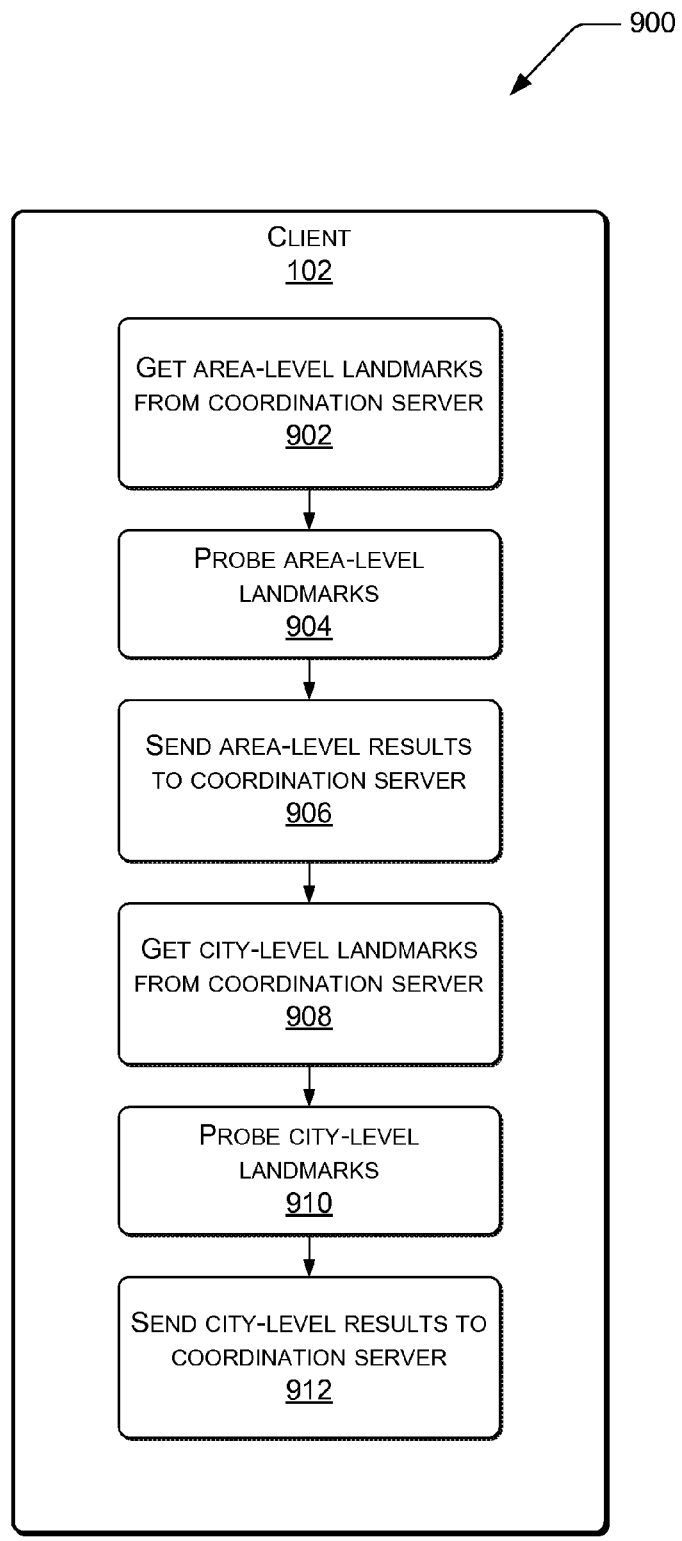
FIG. 9 is a flow diagram of an illustrative process of client probing.

FIG. 9 is a flow diagram showing an illustrative process of client probing 900. At 902, the client 102 gets area-level landmarks from a coordination server. At 904, the client probes the area-level landmarks obtained from the coordination server to determine delay between the client 102 and each of the area-level landmark servers. At 906, the client sends first, area-level results to the coordination server. The first results include a relative magnitude of communication delay between the client and each of the area-level landmark servers.

At 908, the client gets city-level landmarks from the coordination server. At 910, the client probes the city-level landmarks obtained from the coordination server to determine delay between the client and the city-level landmark servers. At 912, the client sends second, city-level results to the coordination server. The second results include a relative magnitude of communication delay between the client and each of the city-level landmark servers.

Figure 10:
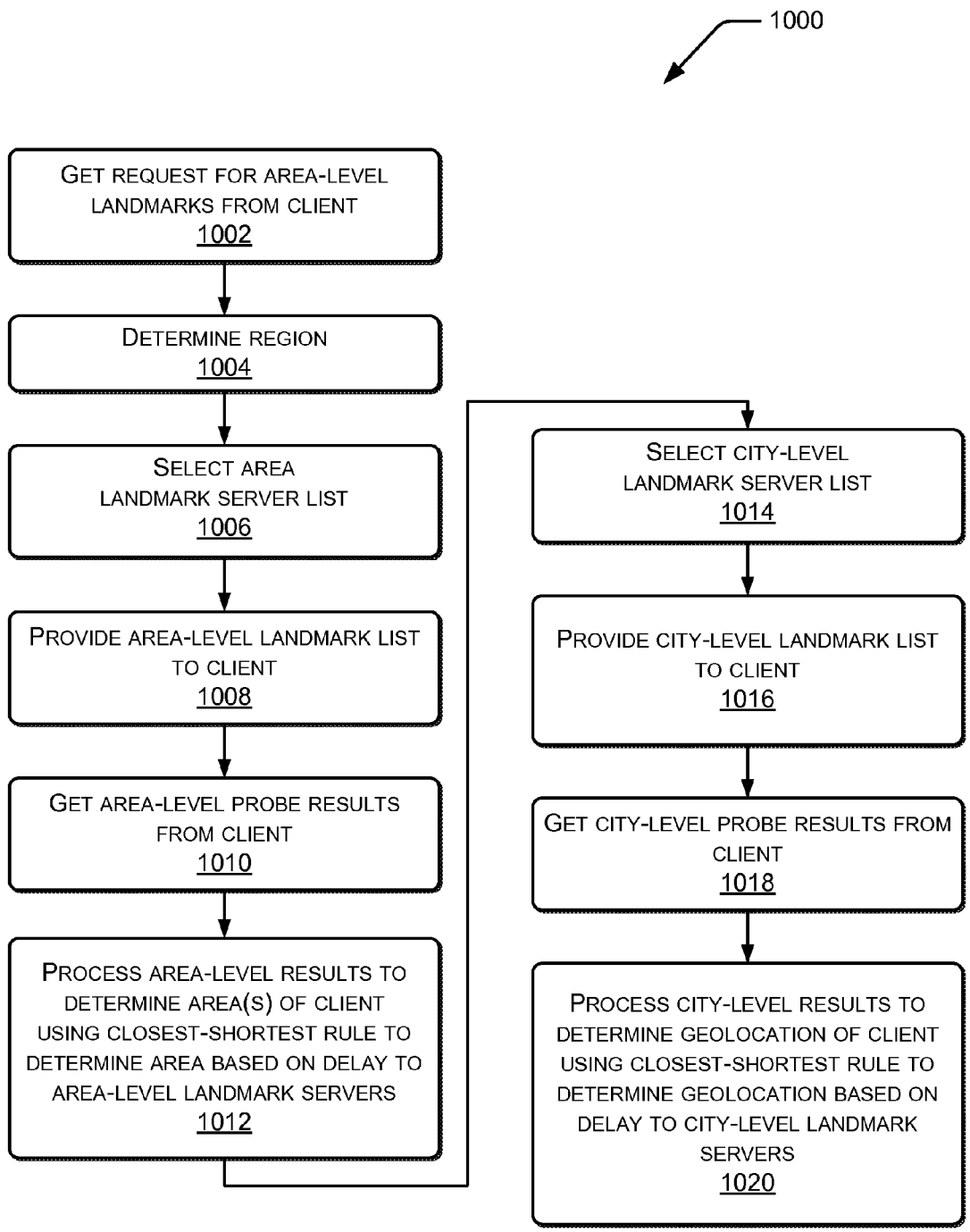
FIG. 10 is a flow diagram of an illustrative process of coordinating server activities in conjunction with client probes.

FIG. 10 is a flow diagram showing other illustrative coordination server activities in conjunction with a client and associated client probes. At 1002, the coordination server gets a request for area-level landmarks from a client. At 1004, the coordination server determines a region in which the client is located. The region determination may be made by using a previously established list of network addresses and their corresponding geolocation.

At 1006, the coordination server selects a list of area landmark servers. At 1008, the coordination server provides this list of area-level landmarks to the client. At 1010, the coordination server receives the area-level probe results from the client.

At 1012, the coordination server processes area-level results to determine the area(s) closest to the client using the closest-shortest rule to determine area(s) based on communication delay between the client and the area-level landmark servers.

At 1014, the coordination server selects a list of city-level landmark servers. At 1016, the coordination server provides the list of city-level landmark servers to the client. At 1018, the coordination server receives the city-level probe results from the client.

At 1020, the coordination server processes city-level results to determine geolocation of the client using the closest-shortest rule based on communication delay between the client and the city-level landmark servers.

Figure 11:
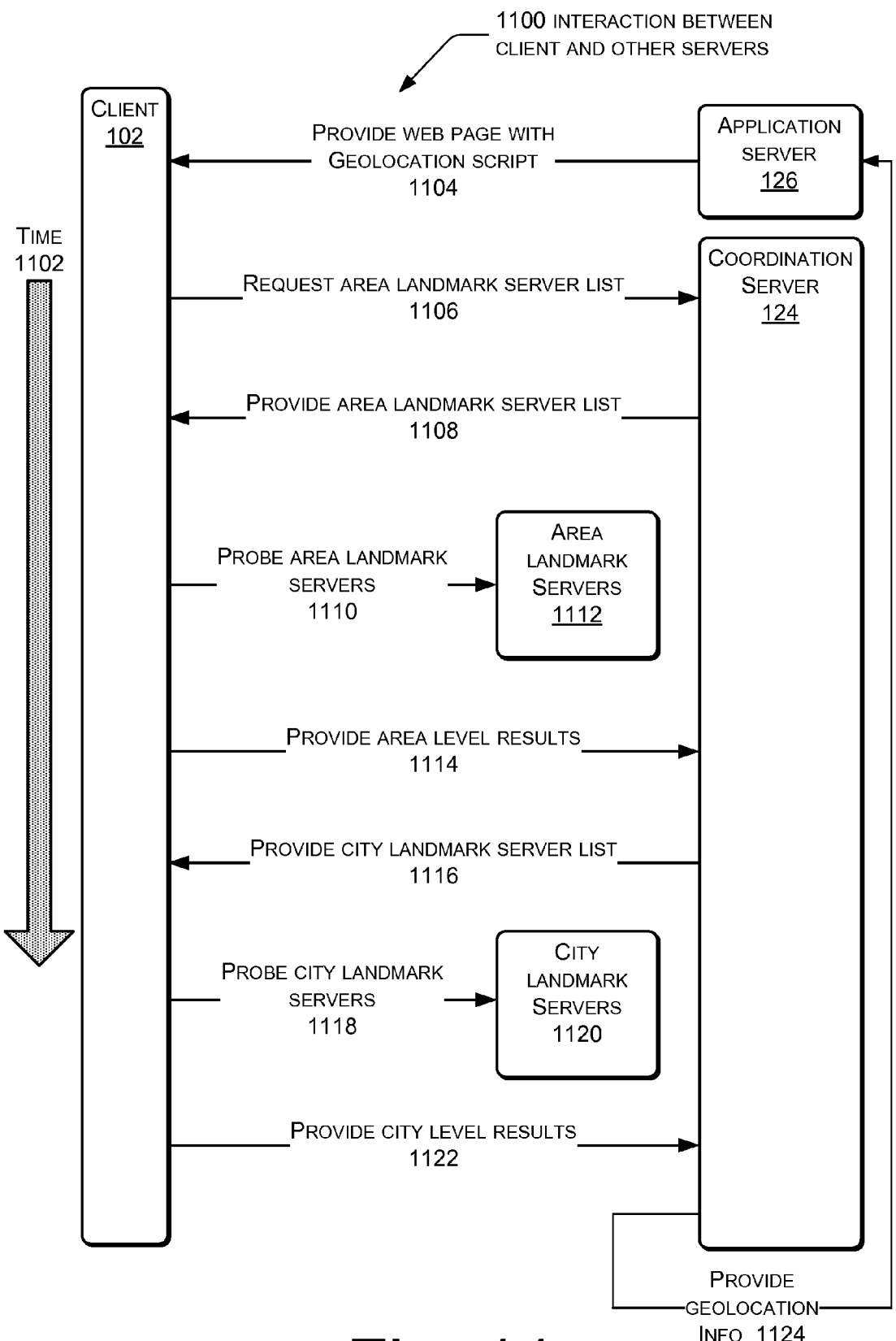
FIG. 11 shows an illustrative flow of information and interaction between a client, an application server, a coordination server, and landmark servers.

FIG. 11 shows illustrative flow of information and interaction between a client 102, an application server 126, a coordination server 124, and landmark servers 1112 and 1118. In this illustration, time increases while progressing down the page, as indicated by arrow 1102.

An application server provides a web page with a geolocation script 1104 to a client 102. The script executing on the client 102 then requests 1106 an area landmark server list from the coordination server 124. The coordination server 124 then provides 1108 an area landmark server list to the client 102. The client 102 then probes 1110 area landmark servers 1112.

Client 102 then provides 1114 area-level results to coordination server 124. Coordination server 124 then provides 1116 a city landmark server list to the client 102. The client 102 then probes 1118 city landmark servers 1120.

Client 102 then provides 1122 city-level results to coordination server 124. Coordination server 124 determines geolocation based on these results, and provides 1124 the geolocation information to the application server 126.

Although specific details of exemplary methods are described with regard to the figures and other flow diagrams presented herein, it should be understood that certain acts shown in the figures need not be performed in the order described, and may be modified, and/or may be omitted entirely, depending on the circumstances. Moreover, the acts and methods described may be implemented by a computer, processor or other computing device based on instructions stored on one or more computer-readable storage media. The computer-readable storage media (CRSM) may be any available physical media that can be accessed by a computing device to implement the instructions stored thereon. CRSM may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computing device

We claim:

1. A method of determining at a coordination server a geographic location of a network client, the method comprising:

receiving at the coordination server a request from the network client; and determining the geographic location of the network client, wherein the determining further comprises:

determining a region in which the network client is located;

providing the network client with a first list of a first set of landmark servers in geographic areas present within the region, each landmark server of the first set of landmark servers having a respective known geographic location;

receiving first results from a probing of the first set of landmark servers, the first results comprising a relative magnitude of communication delay between the network client and each of the landmark servers of first set of landmark servers;

determining a geographic area in which the network client is located by ranking the first results based on the relative magnitude of communication delay between the network client and each of the landmark servers of the first set of landmark servers;

providing the network client with a second list of a second set of landmark servers within the determined geographic area, each landmark server of the second set of landmark servers having a respective known geographic location;

receiving second results from a probing of the second set of landmark servers, the second results comprising a relative magnitude of communication delay between the network client and each of the landmark servers of the second set of landmark servers; and determining a city in which the network client is located by ranking the second results based on the relative magnitude of communication delay between the network client and each of the landmark servers of the second set of landmark servers.

2. The method of claim 1, the determining a region comprises comparing a network client network address with a database of known network address ranges, each address range having a corresponding country or region.

3. The method of claim 1, wherein the first set of landmark servers is randomly selected from a list of available landmark servers located in the determined region, and the second set of landmark servers is randomly selected from a list of available landmark servers located within the determined geographic area.

4. The method of claim 1, the determining the geographic area of the network client further comprises:

determining a first shortest magnitude of communication delay from the relative magnitude of communication delays in the received first results; and using the known geographic location of the respective landmark server having the first shortest magnitude of communication delay; and the determining the city of the network further comprises:
determining a second shortest magnitude of communication delay from the relative magnitude of communication delays in the received second results; and
using the known geographic location of the respective landmark server having the second shortest magnitude of communication delay.

5. The method of claim 1, wherein the request from the network client is generated by a script executing within an internet browser of the network client.

6. The method of claim 1, wherein the probing of at least one of the first set of landmark servers and the second set of landmark servers comprises a Hypertext transfer protocol/Get (HTTP/Get) request or Internet Control Message Protocol (ICMP) request.

7. A method of determining a geographic location of a network client, the method comprising:
receiving a request from the network client at a coordination server;
randomly selecting a first set of landmark servers that are located within a geographical region;
randomly selecting a second set of landmark servers that are located within a subarea of the geographical region based at least on first results from a first probing of the first set of landmark servers, the first results comprising a respective communication delay indicator between the network client and a respective landmark server of the first set of landmark servers; and
determining at the coordination server the geographic location of the network client based at least on second results from a second probing of the second set of landmark servers, the second results comprising a respective communication delay indicator between the network client and a respective landmark server of the second set of landmark servers and knowledge of a geographical location of at least one of the landmark servers of the second set of landmark servers.

8. The method of claim 7, a script executing within an internet browser initiates probes to gather the respective communication delay indicator between the network client and a respective landmark server of the second set of landmark servers.

9. The method of claim 7, the respective communication delay indicator between the network client and a respective landmark server of the second set of landmark servers is gathered using a Hypertext transfer protocol/Get (HTTP/Get) request or Internet Control Message Protocol (ICMP) request initiated by the network client.

10. The method of claim 7, the determining further comprises ranking second results from a plurality of probes by a respective magnitude of delay of traffic between the network client and a respective landmark server of the second set of landmark servers.

11. The method of claim 7, further comprising:
determining the geographical region based at least on a network address of the network client;
providing a first list of the first set of landmark servers to the network client; and
providing a second list of the second set of landmark servers to the network client.

12. The method of claim 11, wherein at least one set of the first set of landmark servers and the second set of landmark servers are passive.

13. A system for determining a geographic location of a client on a network, the system comprising:
an application server connected to the network and configured to deliver a probing module to the client on the network, the probing module configured to execute on the client and interrogate two or more sets of randomly selected landmark servers and collect delay data; and
a coordination server connected to the network and configured to determine a geographic area in which the client is located using at least the collected delay data received from the probing module via iteratively determining a geographical boundary based at least on the collected delay data for a respective one of the sets of randomly selected landmark servers, wherein the geographical boundary determined in a current iteration is smaller than the geographical boundary determined in a previous iteration.

14. The system of claim 13, wherein the probing module comprises a script configured to execute within an internet browser.

15. The system of claim 13, wherein the collected delay data is gathered using a Hypertext transfer protocol/Get (HTTP/Get) request or Internet Control Message Protocol (ICMP) request initiated by the probing module.

16. The system of claim 13, wherein the coordination server is configured to determine the geographic location of the client based at least on ranking the collected delay data from a plurality of interrogations by a magnitude of delay between the client and landmark servers of one of the sets of the two or more sets of randomly selected landmark servers.

17. The system of claim 13, wherein the coordination server is configured to determine the geographic area in which the client is located by, at least:
determining a region in which the client is located based at least on a network address of the client;
configuring the probing module to probe a first set of randomly selected landmark servers in the region to determine a first geographic boundary in which the client is located; and
configuring the probing module to probe a second set of randomly selected landmark servers located within a second geographic boundary to determine a third geographic boundary, which is encompassed by the second geographic boundary, in which the client is located.

18. The system of claim 17, wherein determining a region comprises comparing the network address of the client with a database of known network address ranges, the database including one or more regions corresponding to each address range.

* * * * *